Figure 1:
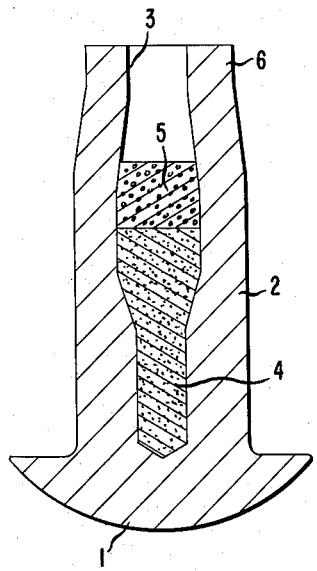

April 4, 1961  B. FURINI, JR  2,977,837
EXPLOSIVELY EXPANDABLE CHEMICAL RIVET
WITH COMPACTIBLE SEALING MEANS
Filed July 3, 1958

INVENTOR
BRUNO FURINI, JR.

BY *Jules H. Steinberg*
ATTORNEY

United States Patent Office 2,977,837
Patented Apr. 4, 1961

2,977,837

EXPLOSIVELY EXPANDABLE CHEMICAL RIVET WITH COMPACTIBLE SEALING MEANS

Bruno Furini, Jr., Kinnelon, N.J., assignor to E. I. du Pont de Nemours and Company, Wilmington, Del., a corporation of Delaware Filed July 3, 1958, Ser. No. 746,446

3 Claims. (Cl. 85—40)

The present invention relates to rivets of the type known as chemically expanded rivets (sometimes called explosive rivets). More particularly, the present invention pertains to a novel chemically expanded rivet which is essentially noiseless in operation.

Rivets containing a chemical explosive charge in the shank portion have been known and used in the art for some time for the fastening of metal components which are inaccessible from one side. Characteristically, such a rivet includes a head portion and a shank portion having a central longitudinal recess. The explosive charge is loaded in this recess. The rivet shank is pressed through aligned holes in the two pieces which are to be joined. Heat is then applied to the head of the rivet which detonates the charge expanding the shank of the rivet in a manner which prevents separation of the pieces through which the shank extends. The expansion of the rivet shank is severe enough to lock the pieces to be joined firmly together. Chemically expanded rivets of this type have seen widespread use in the fastening of skin to airplane bodies, in the assembly of refrigerators, vehicle bodies and similar heavy-duty objects.

One of the limitations on the use of chemically expanded rivets has been the noise which results from their detonation. Of course, the larger the rivet (and the charge of the explosive contained therein), the greater the noise that results from its detonation. Furthermore, if a large number of rivets are being detonated in a single area, the noise developed can become so considerable as to seriously interfere with the efficiency and morale of personnel in the vicinity.

It has long been known that the noise developed by the detonation of a chemically expanded rivet is caused by the violent escape of gases from the open end of the rivet shank. Early attempts to prevent the sudden and explosive escape of these gases, as by screwing a plug into the open end of the rivet or by screwing a cap on the shank of the rivet, resulted in failure. The extreme pressure developed by the confined gases acts to strip the screw threads in any such arrangement and thus to dislodge the plug or cap and propel it outwardly like a projectile. Were it possible to retain such a screw-plug or cap in position upon detonation of the rivet, it would unquestionably act to confine the gases produced by the explosion and would thereby deaden the noise of the explosion.

In U.S. Patent No. 2,807,184 issued September 24, 1957, in the name of R. J. Miller, there is disclosed a later development in the production of a noiseless chemically expanded rivet. In the Miller patent, a cylindrical plug having a roughened or serrated surface is loaded into the rivet shank atop the charge. The shank is then swaged or crimped about this plug, the roughened or serrated surface digging into the inner walls of the recess and thus effecting a relatively tight seal which will confine the gases developed upon detonation of the charge. The chemically expanded rivet disclosed in the Miller patent is generally free from offensive noise when expanded, and has achieved a widespread acceptance in the field. One disadvantage of this prior art rivet is that occasionally the serrated plug will become dislodged and ejected during expansion. When this occurs, the expansion of the rivet is accompanied by a loud report, and the flying plug, of course, represents a distinct hazard to persons or structure in the vicinity. Another principal disadvantage of this rivet does not relate to its performance but rather to its mode of manufacture and assembly. The cylindrical serrated plug cannot simply be dropped into the rivet shank by any convenient means. Because of its shape and configuration, great care must be exercised to insert such a plug into the shank recess at just the proper angle. This has naturally interfered with attempts to automate the production of noiseless rivets and considerable research effort has been expended in an attempt to overcome this difficulty in order that noiseless rivets may be more economically produced.

It is an object of the present invention to provide a chemically expanded rivet which is free from offensive noise in operation. A further object of the invention is to provide such a rivet which may be manufactured in any convenient size without producing great noise or a flying missile upon detonation. A still further object of the invention is to provide such a rivet which is readily susceptible of automatic assembly so that it may be offered to industry at an attractive price. Other and additional objects will become apparent from a consideration of the following specification and claims.

The foregoing objectives are accomplished by providing the explosive rivet with a layer of a fine metallic powder just atop the chemical charge. Upon initiation of the rivet, the pressures and temperatures which develop are sufficient to compact the powder into a slug which seals the open end of the rivet and prevents the occurrence of any loud or offensive noise.

Figure 2:
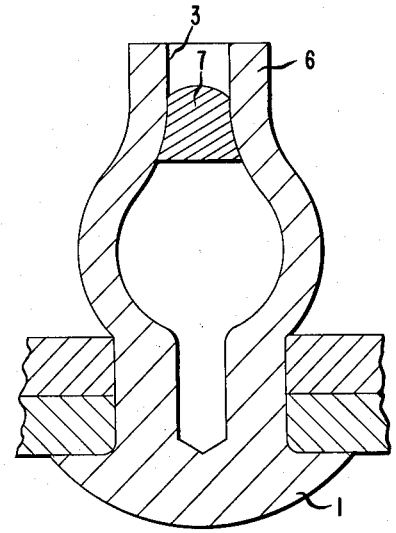
Figure 3:
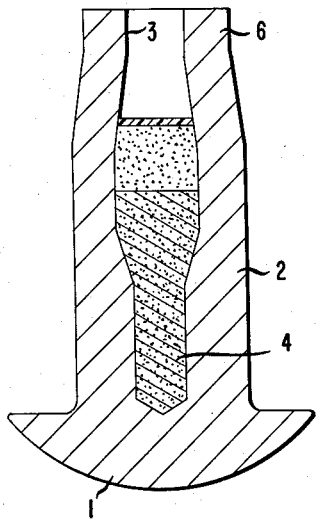

In order to describe the invention more clearly, reference is made to the accompanying drawings which are intended as illustrative only and not to be construed as limiting the invention in any way. In the drawings, Figure 1 represents a rivet manufactured in accordance with the present invention; Figure 2 shows the rivet of Figure 1 in expanded condition securing together two plate members; Figure 3 depicts an alternate embodiment of the invention.

In Figure 1, there is shown a chemical rivet which includes a head 1 and a hollow shank portion 2. A central longitudinal recess 3 in the shank contains a charge of an explosive composition 4. Atop the composition 4, there is a layer of finely divided powder 5, for example powdered aluminum, which, in this embodiment is mechanically pressed in position to form a pressed cake such that the powder will not run out of the recess 3 prior to the time the rivet is to be expanded. The outer end of the rivet shank is constricted at 6 by crimping or swaging for reasons which will be more particularly hereinafter described.

The operation of the rivet is as follows. The rivet is inserted in aligned holes of two plates, or other members to be secured, and heat is applied to the head of the rivet by any suitable means. The heat initiates the explosive charge 4 which propels the pressed powder cake toward the constricted opening 6. When the powder reaches this constriction, sufficient heat and pressure has been generated by the expanding gaseous decomposition products of the charge to substantially compact the powder. The latter is then converted into a solid metal slug or plug indicated at 7 in Figure 2 which shows the rivet in its expanded condition. This metal slug muffles the sound of the detonation. Instead of a report or loud noise, only a mild innocuous clicking sound can be heard which is not in any way painful or disturbing to the human ear.

The slug will not dislodge from the rivet shank, as is sometimes the case with prior art rivets sealed with a serrated plug or the like. The seal which is accomplished with this arrangement is not so completely gas tight that over a period of time some, or even all, of the gas in the interior of the rivet will not escape to the atmosphere. However, this in no way affects the operation or performance of the rivet. So long as the gases cannot rush out suddenly and violently from the longitudinal recess of the shank, there will be no offensive or disturbing noise when the rivet is fired.

In Figure 3, there is disclosed an alternate embodiment of the invention. In Figure 3, the various components are the same as those shown in the embodiment of Figure 1; the sole difference being that in the embodiment of Figure 3, the layer of powder 5 is not mechanically compressed to form a cake at the time of loading. In lieu of this arrangement, the rivet is provided with a thin film of a sealant 8' atop the layer of powder which serves to prevent disturbance of the powder or its egress from the rivet prior to expansion. The sealant may be any suitable substance which can conveniently be poured into the rivet at the time of loading and which will subsequently harden into a shallow film to seal the layer of metal powder in position. For example, the sealant may be wax of any suitable variety, or a thermoplastic resin which can be poured into the rivet in the molten state and allowed to cool, or it may be a thin layer of lacquer or varnish or enamel, or other common coating composition or adhesive which, upon application, will harden to a firm thin seal. The essential property of the sealant is that it can be easily and conveniently poured or loaded into the rivet at the time of manufacture, such that it will form a thin solid layer over the finely divided powder to hold the latter in proper position until the rivet is ready for use.

The explosive charge for the rivet may be any conventional and well-known charge previously used for such products, such as aluminum/lead azide/tetrazine mixtures, aluminum/nitromanite/tetrazine mixtures, or the like.

The finely divided powder may be any available metal including for example powdered aluminum, titanium, tungsten, copper, iron, niobium, metal alloys, or the like. Aluminum is preferred, not only because of its economic advantages, but because of the especially good results that are obtained therewith. A portion of the aluminum powder appears to enter into the reaction, upon initiation of the charge and thus tends to enhance the expansion of the rivet as well as preventing offensive noise.

Rivets of the present invention may be manufactured in any convenient size depending upon the specific function they are ultimately to perform. Thus it is possible to prepare rivets in accordance with the invention having diameters as small as ⅛ inch and as large as ¼ inch. Rivets having larger and smaller dimensions are also feasible. All of these rivets may be conveniently expanded with no greater noise than a mild metallic clicking sound.

The body of the rivet may conveniently be formed of brass, aluminum, or other suitable metal.

Having thus described the chemically expanded rivets of our invention in the foregoing specification, it will be readily apparent to those skilled in the art that many variations in form, material, and dimensions, as well as in mode of assembly may be made without departing from the spirit of the invention. It is intended, therefore, to be limited only by the following claims.

I claim:

1. A sealed chemically-expandable rivet comprising a head portion, a shank member having a central longitudinal recess affixed to said head portion, an explosive charge within said recess, and sealing means atop said explosive charge, the outer end of the shank recess having a portion of gradually reduced diameter, said sealing means comprising a substantial layer of finely-divided non-explosive, compactible metal powder fixed within the larger portion of said recess and of a length which, upon firing of the rivet, will compact into a solid plug within said central longitudinal recess.

2. A rivet as in claim 1 wherein said finely-divided metal powder is aluminum powder.

3. A sealed chemically-expandable rivet comprising a head portion, a shank member having a central longitudinal recess affixed to said head portion, an explosive charge within said recess, and sealing means atop said explosive charge, the outer end of the shank recess having a portion of gradually reduced diameter, said sealing means comprising a substantial layer of pressed finely-divided, compactible metal powder fixed within the larger portion of said recess and of a length which, upon firing of the rivet, will compact into a solid plug within said central longitudinal recess.

References Cited in the file of this patent

UNITED STATES PATENTS

| | | |
|---|---|---|
| 2,412,887 | Huston | Dec. 17, 1946 |
| 2,556,465 | Burrows | June 12, 1951 |
| 2,807,184 | Miller | Sept. 24, 1957 |

FOREIGN PATENTS

| | | |
|---|---|---|
| 467,515 | Great Britain | June 17, 1937 |